United States Patent
Lazarev et al.

(10) Patent No.: US 12,104,127 B2
(45) Date of Patent: Oct. 1, 2024

(54) METHOD FOR PRODUCING PETROLEUM-BASED PROCESS OILS

(71) Applicant: ORGKHIM BCH MANAGEMENT COMPANY, JSC, Nizhny Novgorod (RU)

(72) Inventors: Mikhail Alekseevich Lazarev, Nizhny Novgorod (RU); Tatyana Vladimirovna Fedotova, Nizhny Novgorod (RU)

(73) Assignee: ORGKHIM BCH MANAGEMENT COMPANY, JSC, Nizhny Novgorod (RU)

(*) Notice: Subject to any disclaimer, the term of this patent is extended or adjusted under 35 U.S.C. 154(b) by 197 days.

(21) Appl. No.: 17/774,343

(22) PCT Filed: Dec. 27, 2019

(86) PCT No.: PCT/RU2019/001032
§ 371 (c)(1),
(2) Date: May 4, 2022

(87) PCT Pub. No.: WO2021/091417
PCT Pub. Date: May 14, 2021

(65) Prior Publication Data
US 2022/0363999 A1 Nov. 17, 2022

(30) Foreign Application Priority Data

Nov. 7, 2019 (RU) .................. RU2019135648

(51) Int. Cl.
*C10G 7/00* (2006.01)
*C08K 5/00* (2006.01)
*C10G 21/16* (2006.01)
*C10G 55/06* (2006.01)
*C10G 61/02* (2006.01)

(52) U.S. Cl.
CPC .............. *C10G 7/00* (2013.01); *C08K 5/0016* (2013.01); *C10G 21/16* (2013.01); *C10G 55/06* (2013.01); *C10G 61/02* (2013.01); *C10G 2300/1059* (2013.01); *C10G 2300/1096* (2013.01); *C10G 2300/301* (2013.01); *C10G 2300/302* (2013.01); *C10G 2300/308* (2013.01); *C10G 2400/30* (2013.01)

(58) Field of Classification Search
CPC .......... C10G 7/00; C10G 55/06; C10G 61/02; C10G 2400/30; C08K 5/0016
See application file for complete search history.

(56) References Cited

U.S. PATENT DOCUMENTS

| | | | |
|---|---|---|---|
| 9,512,366 B2 | 12/2016 | Meliana et al. | |
| 2016/0002543 A1* | 1/2016 | Tsebulaev | C10G 21/28 |
| | | | 208/289 |
| 2018/0112141 A1* | 4/2018 | Patrick | C10G 67/0481 |
| 2018/0142165 A1* | 5/2018 | Patrick | C10G 45/44 |

FOREIGN PATENT DOCUMENTS

| | | | |
|---|---|---|---|
| CN | 104212488 A | * | 12/2014 |
| CN | 106190292 A | | 12/2016 |
| RU | 2155209 C2 | | 8/2000 |
| RU | 2313562 C1 | | 12/2007 |
| RU | 2581649 C2 | | 4/2016 |
| RU | 2666739 C1 | | 9/2018 |
| WO | 2010/100155 A1 | | 9/2010 |

OTHER PUBLICATIONS

English machine translation of CN 104212488 (Year: 2014).*
International Search Report for Application No. PCT/RU2019/001032 mailed on Aug. 20, 2020.
Written Opinion for Application No. PCT/RU2019/001032 mailed on Aug. 20, 2020.

* cited by examiner

*Primary Examiner* — Renee Robinson
(74) *Attorney, Agent, or Firm* — Ladas & Parry LLP

(57) ABSTRACT

A method for producing a low-viscosity high-aromatic non-carcinogenic petroleum-based process oil which can be used as a plasticizer oil or an extender oil in the manufacture of synthetic rubber and tyres is described. The oil is obtained from by-product fractions of secondary petrochemical processes by fractional distillation, wherein the used by-product fractions of secondary petrochemical processes are products of catalytic cracking, or products of catalytic reforming, or aromatic extracts, or mixtures thereof, which have an initial boiling point of no less than 200° C. and above and a final boiling point of no less than 360° C. at atmospheric pressure, and contain no less than 85% of aromatic constituents and no more than 10.0 mg/kg of the sum of the following polycyclic aromatic hydrocarbons: benz[a]anthracene; chrysene; benzo[b]fluoranthene; benzo[i]fluoranthene; benzo[k]fluoranthene; benzo[e]pyrene; benzo[a]pyrene; and dibenzo[a,h]anthracene.

1 Claim, No Drawings

METHOD FOR PRODUCING PETROLEUM-BASED PROCESS OILS

RELATED APPLICATION

This application is an application under 35 U.S.C. 371 of International Application No. PCT/RU2019/001032 filed 27 Dec. 2019, which claims priority from Russian Application 2019135648 filed 7 Nov. 2019, the disclosures of which are incorporated in their entirety by reference herein.

TECHNICAL FIELD OF THE INVENTION

The present invention relates to chemical and oil processing industries and can be used for the production of petroleum-based plasticizer oils or extender oils used in the manufacture of synthetic rubber and tyres.

BACKGROUND OF THE INVENTION

Pursuant to the EU Directive, since Jan. 1, 2010, it is prohibited to use and import on the EU territory plasticizer oils for any parts of tyres and components thereof containing more than 10 mg/kg of the sum of the following polycyclic aromatic hydrocarbons: benz[a]anthracene; chrysene; benzo[b]fluoranthene; benzo[i]fluoranthene; benzo[k]fluoranthene; benzo[e]pyrene; benzo[a]pyrene; dibenzo[a,h]anthracene (hereinafter referred to in the text as 8 PAHs); and specifically more than 1 mg/kg benzo[a]pyrene, what imposes significant restrictions on the used plasticizer oils. Plasticizer oils with the said amount of 8 PAHs are related to the category of carcinogenically safe.

There are known methods for producing high aromatic plasticizer oils by refining petroleum fractions from PAHs using a selective solvent extraction method. For example there is a known use of phenol, furfurol, N-methylpyrrolidone as selective solvents [Handbook of Oil Refiner/under the general editorship of S. K. Ogorodnikov. Volume 1.—Leningrad: Khimiya, 1978.—496 pages [in Russian]; Handbook of Oil Refiner/under the editorship of G. A. Lastovkin, E. D. Radchenko, M. G. Rudin.—Leningrad: Khimiya 1986.—648 pages [in Russian]; Oil and Gas Processing Technology. Part 1/I. L. Gurevich—Moscow: Khimiya, 1972.—360 pages [in Russian]; Oil Processing Technology. In two parts. Part one. Primary Oil Refining/ under the editorship of O. F. Glagoleva and V. M. Kapustin.—Moscow: Khimiya, Kolos, 2007.—400 pages [in Russian]; Control of Oil and Paraffin Production/D. O. Goldberg—Moscow: Khimiya, 1964.—247 pages [in Russian]].

There is a known use as a selective solvent of dimethyl sulfoxide [patent RU no 2279466 C1, published on Jul. 10, 2006], propylene carbonate [patent RU no 2520096 C1, published on Apr. 23, 2013], propylene carbonate-N-methylpyrrolidone [patent RU no 2550823 C1, published on May 20, 2015], dimethylacetamide [patent RU no 2513020 C1, published on Apr. 20, 2014].

The drawback of said methods consists in the production of raffinates with a low level of aromatic constituents—not more than 85%, the extract, in contrast, having a high content of aromatic constituents—up to 96% but significantly exceeding the standard of 8 PAHs level (between 20 and 500 mg/kg), what does not allow using the known methods for producing plasticizer oils satisfying up-to date requirements.

There are known processes for producing plasticizer oils by targeted organic synthesis methods [International applications WO2012062474 and WO2012048874]. Plasticizer oils, produced by the known methods satisfy up-to date requirements and are not carcinogenic. However the known methods are expensive and plasticizer oils produced thereby have a high price that is nearly the same as the price of a polyurethane semi-finished product.

There is a known method for producing base stocks for low pour point petroleum base oils by a combination of vacuum distillation to produce oil fractions and selective solvent refining of oil fractions with a subsequent low temperature dewaxing, vacuum flashing and catalytic final treatment to produce oils [patent RU no 2155209 C2, published on Aug. 27, 2000]. The method allows producing low pour point petroleum base oils. The drawback of the known method is the availability of multiple stages and complexity.

The closest to the claimed method is the method for producing a plasticizer for polymeric materials from secondary processing products such as 2-ethylhexanol distillation bottoms and a terephthalic acid production waste [patent RU no 2666739 C1, published on Sep. 12, 2018].

The known method allows producing a plasticizer from a terephthalic acid production waste, what significantly expands a feedstock source of the plasticizer production in general. However a plasticizer produced by the known method does not satisfy up-to date requirements to the 8 PAHs levels.

SUMMARY OF THE INVENTION

The proposed invention is intended to solve the task of producing a carcinogenically safe low-viscosity high aromatic petroleum-based extender oil satisfying up-to date requirements using a simplified technology.

The raised problem is solved by producing a low-viscosity high aromatic non-carcinogenic petroleum-based process oil from by-product fractions of secondary petrochemical processes by fractional distillation, wherein the used by-product fractions of secondary petrochemical processes are products of catalytic cracking, or products of catalytic reforming, or aromatic extracts, or mixtures thereof, which have an initial boiling point of no less than 200° C. and a final boiling point of no less than 360° C. at atmospheric pressure and contain no less than 85% of aromatic constituents and no more than 10.0 mg/kg of the sum of the following polycyclic aromatic hydrocarbons: benz[a]anthracene; chrysene; benzo[b]fluoranthene; benzo[j]fluoranthene; benzo[k]fluoranthene; benzo[e]pyrene; benzo[a]pyrene; dibenzo[a,h]anthracene, wherein the fractional distillation process is carried out at a reduced or atmospheric pressure and the fractional distillate is withdrawn at temperatures from the initial boiling point to 420° C. in terms of atmospheric pressure, with a reflux ratio of no less than 0.1.

A new technical result of the proposed method is the improved quality of the target product containing more than 90% of aromatic constituents, with the content of the sum of 8 PAHs of less than 10 mg/kg, the level of benzo[a]pyrene being less than 1.0 mg/kg.

This technical result is determined by the use in the proposed method as a feedstock of by-product fractions of secondary petrochemical processes that have specific properties, notably have an initial boiling point of no less than 200° C. and a final boiling point of no less than 360° C. at atmospheric pressure and contain no less than 85% of aromatic constituents.

During the search for solution of the problem of producing low-viscosity high aromatic process oil with a low 8

PAHs content different feedstock sources were considered. It was surprisingly found that the heavy gasoil of the catalytic cracking which had a boiling range distribution of ≈200° C. to ≈500° C. at atmospheric pressure and contained predominantly light fractions, provided during the distillation a high yield of low-viscosity high aromatic non-carcinogenic petroleum-based process oil (up to 90%). The further experiments determined that a similar effect was also maintained for other by-product fractions of secondary petrochemical processes to which products of catalytic cracking, or products of catalytic reforming, or aromatic extracts were related. Different mixtures thereof were further experimentally tested and also showed a positive result.

In the course of trial experiments we determined that 8 PAHs with five, six and more fused cycles were predominantly concentrated in bottoms during the distillation. Moreover light mono-, bi-, tricyclic hydrocarbons were concentrated in the distillate. So they can be easily separated.

The proposed method for producing a low-viscosity high aromatic non-carcinogenic petroleum-based process oil consisting in the distillation of by-product fractions of secondary petrochemical processes, a mixture thereof, containing more than 85% of aromatic constituents and having an initial boiling point of no less than 200° C. and a final boiling point of no less than 360° C., is carried out under the following conditions: the distillation process is performed at atmospheric or reduced pressure; with the reflux ratio of no less than 0.1; the distillate (the target fraction) withdrawal is performed at temperatures from the initial boiling point to 420° C. in terms of atmospheric pressure.

The proposed method allows producing a low-viscosity high aromatic non-carcinogenic petroleum-based process oil containing no less than 90% of aromatic constituents, less than 1.0 mg/kg of benzo[a]pyrene and less than 10.0 mg/kg of the sum of the following polycyclic aromatic hydrocarbons: benz[a]anthracene; chrysene; benzo[b]fluoranthene; benzo[j]fluoranthene; benzo[k]fluoranthene; benzo[e]pyrene; benzo[a]pyrene; dibenzo[a,h]anthracene.

The produced low-viscosity high aromatic non-carcinogenic petroleum-based process oil is characterized by necessary physical, chemical and special-purpose properties and can be used as a plasticizer oil for rubber or an extender oil for polyurethane.

DETAILED DESCRIPTION OF THE INVENTION

The claimed method is carried out in the following way.

Feedstock (by-product fractions of secondary petrochemical processes—products of catalytic cracking, or products of catalytic reforming, or aromatic extracts, or mixtures thereof) is fed to a distillation column in the still. The feedstock is heated to the initial boiling point, thereby vapors begin to rise the column and come to a reflux exchanger, where they are condensed and returned back to the column reflux. At the same time PAHs with five and six fused cycles begin to concentrate in the column still and their concentration in the vapors, in its turn, decreases to an acceptable level. Once the equilibrium between the vapors and the distilled reflux is established, a reflux divider is switched to the distillate withdrawal. Then the reflux ratio is set to no less than ⅒, i.e. one part is fed to the column reflux and 10 parts for the withdrawal, advantageously the reflux ratio is set as 2 to 4. The distillate is withdrawn until the final boiling point of the withdrawn distillate rises to 420° C. in terms of atmospheric pressure. The distillation is performed both under vacuum and at atmospheric pressure.

Moreover when a mixture of by-product fractions of secondary petrochemical processes is used as a feedstock the fractions can be at any ratios.

INDUSTRIAL APPLICABILITY

The following examples illustrate this invention.

Example 1

A heavy gasoil from a catalytic cracking unit was used as a feedstock that had the initial boiling point of 250° C., the final boiling point of 400° C., the content of aromatic constituents of 86%, the density at 20° C. of 1032 kg/m$^3$ and the content of 8 listed PAHs: benz[a]anthracene; chrysene; benzo[b]fluoranthene; benzo[j]fluoranthene; benzo[k]fluoranthene; benzo[e]pyrene; benzo[a]pyrene; dibenzo[a,h]anthracene of 512 mg/kg and specifically of benzo[a]pyrene of 8.5 mg/kg.

The distillation was performed at the residual pressure of 3 mm Hg on a glass distillation column with a random packing having 10 theoretical plates. During the experiment the distillate was withdrawn with the vapor temperatures from the initial boiling point to 194° C. Then the reflux ratio was 5-6.

The experiment resulted in the production of a low-viscosity high aromatic non-carcinogenic petroleum-based process oil with the content of aromatic constituents of 91% and the content of 8 PAHs: benz[a]anthracene; chrysene; benzo[b]fluoranthene; benzo[j]fluoranthene; benzo[k]fluoranthene; benzo[e]pyrene; benzo[a]pyrene; dibenzo[a,h]anthracene of 0.25 mg/kg and specifically of benzo[a]pyrene of below the detection limit (i.e. below 0.01 mg/kg).

Example 2

A light aromatic extract obtained in the distillation of a vacuum gasoil with furfurol was used as a feedstock that had the boiling point of 300° C., the final boiling point of 450° C., the content of aromatic constituents of 93%, the density at 20° C. of 1027 kg/m$^3$ and the content of 8 PAHs: benz[a]anthracene; chrysene; benzo[b]fluoranthene; benzo[j]fluoranthene; benzo[k]fluoranthene; benzo[e]pyrene; benzo[a]pyrene; dibenzo[a,h]anthracene of 98 mg/kg and specifically of benzo[a]pyrene of 1.2 mg/kg.

The distillation was performed on the equipment according to example 1 under similar conditions.

The experiment resulted in the production of a low-viscosity high aromatic non-carcinogenic petroleum-based process oil containing 92% of aromatic constituents and having the content of 8 PAHs: benz[a]anthracene; chrysene; benzo[b]fluoranthene; benzo[j]fluoranthene; benzo[k]fluoranthene; benzo[e]pyrene; benzo[a]pyrene; dibenzo[a,h]anthracene of 0.12 mg/kg and specifically of benzo[a]pyrene of below the detection limit.

Example 3

A light aromatic extract obtained in the distillation of a vacuum gasoil with phenol was used as a feedstock that had the initial boiling point of 280° C., the final boiling point of 480° C., the content of aromatic constituents of 93%, the density at 20° C. of 1017 kg/m$^3$ and the content of 8 PAHs: benz[a]anthracene; chrysene; benzo[b]fluoranthene; benzo[j]fluoranthene; benzo[k]fluoranthene; benzo[e]pyrene; benzo[a]pyrene; dibenzo[a,h]anthracene of 98 mg/kg and specifically of benzo[a]pyrene of 1.2 mg/kg.

The distillation was performed on the equipment according to example 1 under similar conditions.

The experiment resulted in the production of a low-viscosity high aromatic non-carcinogenic petroleum-based process oil containing 92% of aromatic constituents and having the content of 8 PAHs: benz[a]anthracene; chrysene; benzo[b]fluoranthene; benzo[j]fluoranthene; benzo[k]fluoranthene; benzo[e]pyrene; benzo[a]pyrene; dibenzo[a,h]anthracene of 0.19 mg/kg and specifically of benzo[a]pyrene of below the detection limit.

Example 4

A vacuum gasoil catalytic reforming product was used as a feedstock that had the initial boiling point of 220° C., the final boiling point of 470° C., the content of aromatic constituents of 98%, the density at 20° C. of 1036 kg/m$^3$ and the content of 8 PAHs: benz[a]anthracene; chrysene; benzo[b]fluoranthene; benzo[j]fluoranthene; benzo[k]fluoranthene; benzo[e]pyrene; benzo[a]pyrene; dibenzo[a,h]anthracene of 1593 mg/kg and specifically of benzo[a]pyrene of 355 mg/kg.

The distillation was performed on the equipment according to example 1. The distillation was performed with the reflux ratio of 4 and the pressure of 5-6 mm Hg, wherein the fraction that distillated in vapors up to 190° C. was withdrawn.

The experiment resulted in the production of a low-viscosity high aromatic non-carcinogenic petroleum-based process oil containing 100% of aromatic constituents with the content of 8 PAHs: benz[a]anthracene; chrysene; benzo[b]fluoranthene; benzo[j]fluoranthene; benzo[k]fluoranthene; benzo[e]pyrene; benzo[a]pyrene; dibenzo[a,h]anthracene of 0.11 mg/kg and specifically of benzo[a]pyrene of below the detection limit.

Example 5

A mixture of a catalytic cracking product and an aromatic extract at a ratio of 10:90 vol. % was used as a feedstock that had the initial boiling point of 230° C., the final boiling point of 475° C., the content of aromatic constituents of 93%, the density at 20° C. of 1029 kg/m$^3$ and the content of 8 PAHs: benz[a]anthracene; chrysene; benzo[b]fluoranthene; benzo[j]fluoranthene; benzo[k]fluoranthene; benzo[e]pyrene; benzo[a]pyrene; dibenzo[a,h]anthracene of 156 mg/kg and specifically of benzo[a]pyrene of 1.6 mg/kg.

The distillation was performed on the equipment according to example 1 under similar conditions.

The experiment resulted in the production of a low-viscosity high aromatic non-carcinogenic petroleum-based process oil containing 91% of aromatic constituents and having the content of 8 PAHs: benz[a]anthracene; chrysene; benzo[b]fluoranthene; benzo[j]fluoranthene; benzo[k]fluoranthene; benzo[e]pyrene; benzo[a]pyrene; dibenzo[a,h]anthracene of 1.8 mg/kg and specifically of benzo[a]pyrene of below the detection limit.

Example 6

A mixture of a catalytic reforming product and an aromatic extract at a ratio of 80:20 vol. % was used as a feedstock that had the initial boiling point of 220° C., the final boiling point of 454° C., the content of aromatic constituents of 95%, the density at 20° C. of 1033 kg/m$^3$ and the content of 8 PAHs: benz[a]anthracene; chrysene; benzo[b]fluoranthene; benzo[j]fluoranthene; benzo[k]fluoranthene; benzo[e]pyrene; benzo[a]pyrene; dibenzo[a,h]anthracene of 1048 mg/kg and specifically of benzo[a]pyrene of 266 mg/kg.

The distillation was performed on the equipment according to example 1 under similar conditions.

The experiment resulted in the production of a low-viscosity high aromatic non-carcinogenic petroleum-based process oil containing 94% of aromatic constituents, of which the sum of 8 PAHs: benz[a]anthracene; chrysene; benzo[b]fluoranthene; benzo[j]fluoranthene; benzo[k]fluoranthene; benzo[e]pyrene; benzo[a]pyrene; dibenzo[a,h]anthracene was 2.0 mg/kg and specifically the content of benzo[a]pyrene was 0.05 mg/kg.

Example 7

A product similar to that of example 4 was used as a feedstock.

The distillation was performed on a metal pilot plant equipped with a still of 10 L, a column of 1 m in height and 50 mm in diameter filled with a ring random packing of 8 mm in diameter and 0.3 mm in thickness and a spiral reflux condenser with the heat exchange surface of 0.3 m$^2$. The still was loaded with the feedstock—6 L. The heating was provided by a 2 kW electric heating jacket. The process was performed at the reflux ratio of 5-6 and the residual pressure of 10-20 mm Hg, wherein the fraction that distillated in vapors up to 200° C. was withdrawn.

The experiment resulted in the production of a low-viscosity high aromatic non-carcinogenic petroleum-based process oil containing 93.9% of aromatic constituents and having the content of 8 PAHs: benz[a]anthracene; chrysene; benzo[b]fluoranthene; benzo[j]fluoranthene; benzo[k]fluoranthene; benzo[e]pyrene; benzo[a]pyrene; dibenzo[a,h]anthracene of 2.06 mg/kg and specifically of benzo[a]pyrene of 0.073 mg/kg.

Example 8

A product similar to that of example 4 was used as a feedstock.

The distillation was performed on a pilot plant described in example 7 at atmospheric pressure. During the distillation the fraction that distillated in vapors up to 350° C. was withdrawn, the temperature in the still having been raised up to 420° C.

The experiment resulted in the production of a low-viscosity high aromatic non-carcinogenic petroleum-based process oil containing 93.2% of aromatic constituents with the content of 8 PAHs: benz[a]anthracene; chrysene; benzo[b]fluoranthene; benzo[j]fluoranthene; benzo[k]fluoranthene; benzo[e]pyrene; benzo[a]pyrene; dibenzo[a,h]anthracene of 0.512 mg/kg and specifically of benzo[a]pyrene of 0.047 mg/kg.

Example 9

A mixture of catalytic cracking and catalytic reforming products and an aromatic extract at a ratio of 40:40:20 vol. % was used as a feedstock that had the initial boiling point of 250° C., the final boiling point of 480° C., the content of aromatic constituents of 93%, the density at 20° C. of 1027 kg/m$^3$ and the content of 8 PAHs: benz[a]anthracene; chrysene; benzo[b]fluoranthene; benzo[j]fluoranthene; benzo[k]fluoranthene; benzo[e]pyrene; benzo[a]pyrene; dibenzo[a,h]anthracene of 972 mg/kg and specifically of benzo[a]pyrene of 190 mg/kg.

The distillation was performed at the reflux ratio of 2 and the residual pressure of 5.5 mm Hg, wherein the fraction that distillated in vapors up to 189° C. was withdrawn.

The experiment resulted in the production of a low-viscosity high aromatic non-carcinogenic petroleum-based process oil containing 94.2% of aromatic constituents and having the content of 8 PAHs: benz[a]anthracene; chrysene; benzo[b]fluoranthene, benzo[j]fluoranthene; benzo[k]fluoranthene; benzo[e]pyrene; benzo[a]pyrene; dibenzo[a,h]anthracene of 3.35 mg/kg and specifically of benzo[a]pyrene of 0.42 mg/kg.

Example 10

A mixture of catalytic cracking and catalytic reforming products at a ratio of 50:50 vol. % was used as a feedstock that had the initial boiling point of 225° C., the final boiling point of 465° C., the content of aromatic constituents of 89%, the density at 20° C. of 1034 kg/m³ and the content of 8 PAHs: benz[a]anthracene; chrysene; benzo[b]fluoranthene; benzo[j]fluoranthene; benzo[k]fluoranthene; benzo[e]pyrene; benzo[a]pyrene; dibenzo[a,h]anthracene of 972 mg/kg and specifically of benzo[a]pyrene of 289 mg/kg.

The distillation was performed on the equipment according to example 7. The distillation was performed at the reflux ratio of 4 and the residual pressure of 5.5 mm Hg, wherein the fraction that distillated in vapors up to 189° C. was withdrawn.

The experiment resulted in the production of a low-viscosity high aromatic non-carcinogenic petroleum-based process oil containing 92% of aromatic constituents and having the content of 8 PAHs: benz[a]anthracene; chrysene; benzo[b]fluoranthene; benzo[j]fluoranthene; benzo[k]fluoranthene; benzo[e]pyrene; benzo[a]pyrene; dibenzo[a,h]anthracene of 1.4 mg/kg and specifically of benzo[a]pyrene of 0.071 mg/kg.

Example 11

A mixture of catalytic cracking and catalytic reforming products and an aromatic extract at a ratio of 30:30:40 vol. % was used as a feedstock that had the initial boiling point of 250° C., the final boiling point of 480° C., the content of aromatic constituents of 92.5%, the density at 20° C. of 1027 kg/m³ and the content of 8 PAHs: benz[a]anthracene; chrysene; benzo[b]fluoranthene; benzo[j]fluoranthene; benzo[k]fluoranthene; benzo[e]pyrene; benzo[a]pyrene; dibenzo[a,h]anthracene of 825 mg/kg and specifically of benzo[a]pyrene of 108.5 mg/kg.

The distillation was performed on the equipment according to example 7. The distillation was performed at the reflux ratio of 2 and the residual pressure of 5.5 mm Hg, wherein the fraction that distillated in vapors up to 190° C. was withdrawn.

The experiment resulted in the production of a low-viscosity high aromatic non-carcinogenic petroleum-based process oil containing 95% of aromatic constituents and having the content of 8 PAHs: benz[a]anthracene; chrysene; benzo[b]fluoranthene; benzo[j]fluoranthene; benzo[k]fluoranthene; benzo[e]pyrene; benzo[a]pyrene; dibenzo[a,h]anthracene of 1.2 mg/kg and specifically of benzo[a]pyrene of 0.06 mg/kg.

Example 12

A mixture of catalytic cracking and catalytic reforming products and an aromatic extract at a ratio of 20:20:60 vol. % was used as a feedstock that had the initial boiling point of 235° C., the final boiling point of 660° C., the content of aromatic constituents of 77%, the density at 20° C. of 1045 kg/m³ and the content of 8 PAHs: benz[a]anthracene; chrysene; benzo[b]fluoranthene; benzo[j]fluoranthene; benzo[k]fluoranthene; benzo[e]pyrene; benzo[a]pyrene; dibenzo[a,h]anthracene of 435 mg/kg and specifically of benzo[a]pyrene of 7 mg/kg.

The distillation was performed on the equipment according to example 7. The distillation was performed at the reflux ratio of 2 and the residual pressure of 10 mm Hg, wherein the fraction that distillated in vapors up to 220° C. was withdrawn.

The experiment resulted in the production of a low-viscosity high aromatic non-carcinogenic petroleum-based process oil containing 90% of aromatic constituents and having the content of 8 PAHs: benz[a]anthracene; chrysene; benzo[b]fluoranthene; benzo[j]fluoranthene; benzo[k]fluoranthene; benzo[e]pyrene; benzo[a]pyrene; dibenzo[a,h]anthracene of 5.2 mg/kg and specifically of benzo[a]pyrene of 0.04 mg/kg.

Example 13

A mixture of catalytic cracking and catalytic reforming products and an aromatic extract at a ratio of 90:5:5 vol. % was used as a feedstock that had the initial boiling point of 189° C., the final boiling point of higher than 700° C., the content of aromatic constituents of 69%, the density at 20° C. of 1016 kg/m³ and the content of 8 PAHs: benz[a]anthracene; chrysene; benzo[b]fluoranthene; benzo[j]fluoranthene; benzo[k]fluoranthene; benzo[e]pyrene; benzo[a]pyrene; dibenzo[a,h]anthracene of 16251 mg/kg and specifically of benzo[a]pyrene of 1066 mg/kg.

The distillation was performed on the equipment according to example 8. The distillation was performed at the reflux ratio of 2 and the residual pressure of 6 mm Hg, wherein the fraction that distillated in vapors up to 200° C. was withdrawn.

The experiment resulted in the production of a low-viscosity high aromatic non-carcinogenic petroleum-based process oil containing 91% of aromatic constituents and having the content of 8 PAHs: benz[a]anthracene; chrysene; benzo[b]fluoranthene; benzo[j]fluoranthene; benzo[k]fluoranthene; benzo[e]pyrene; benzo[a]pyrene; dibenzo[a,h]anthracene of 9.9 mg/kg and specifically of benzo[a]pyrene of 0.89 mg/kg.

Example 14

A mixture of catalytic cracking and catalytic reforming products at a ratio of 10:90 vol. % was used as a feedstock that had the initial boiling point of 192° C., the final boiling point of 470° C., the content of aromatic constituents of 79%, the density at 20° C. of 1034 kg/m³ and the content of 8 PAHs: benz[a]anthracene; chrysene; benzo[b]fluoranthene; benzo[j]fluoranthene; benzo[k]fluoranthene; benzo[e]pyrene; benzo[a]pyrene; dibenzo[a,h]anthracene of 849 mg/kg and specifically of benzo[a]pyrene of 86 mg/kg.

The distillation was performed on the equipment according to example 1. The distillation was performed at the reflux ratio of 0.1 and the residual pressure of 5.5 mm Hg, wherein the fraction that distillated in vapors up to 185° C. was withdrawn.

The experiment resulted in the production of a low-viscosity high aromatic non-carcinogenic petroleum-based process oil containing 92% of aromatic constituents and having the content of 8 PAHs: benz[a]anthracene; chrysene; benzo[b]fluoranthene; benzo[j]fluoranthene; benzo[k]fluoranthene; benzo[e]pyrene; benzo[a]pyrene; dibenzo[a,h]anthracene of 3.1 mg/kg and specifically of benzo[a]pyrene of 0.15 mg/kg.

Example 15

The low-viscosity high aromatic non-carcinogenic petroleum-based process oil obtained in example 1 was used as plasticizer oil for the butadiene-styrene rubber DSSK-2560. A model rubber mixture was prepared using the following ratios:

| N | Principal ingredients | Parts by weight |
|---|---|---|
| 1 | SKI-3 | 30.0 |
| 2 | DSSK-2560 | 70.0 |
| 3 | Carbon black N 339 | 13.0 |
| 4 | Silica | 86.0 |
| 5 | Plasticizer oil | 50.0 |
| 6 | Sulfur | 1.7 |

The commercially available plasticizer oil prepared according to the patent of the RF no 2313562 related to purified distillate aromatic extracts was used for comparison.

The rubber mixing allowed obtaining the following data:

One can see from the provided data that the deviation of the principal characteristics both of rubber fluxing and curing processes and of the properties of rubber mixtures and cured rubbers is within ±10%, what is not significant. So the proposed low-viscosity high aromatic non-carcinogenic petroleum-based process oil can be used as plasticizer oil for butadiene-styrene rubbers for replacing purified aromatic extracts in rubber mixtures.

Example 16

The low-viscosity high aromatic non-carcinogenic petroleum-based process oil obtained in example 1 was used as plasticizer oil for the butadiene-nitrile rubber BNKS-28 AMN. A model rubber mixture was prepared using the following ratios:

| N | Name of ingredients | Parts by weight |
|---|---|---|
| 1 | Rubber BNKS-28 AMN | 100.0 |
| 2 | Carbon black | 60.0 |
| 3 | Plasticizer oil | 10.0 |
| 4 | Zinc oxide | 3.0 |
| 5 | Stearic acid | 1.0 |
| 6 | Sulfur | 1.5 |
| 7 | Sulfenamide | 0.7 |

The commercially available dibutyl phthalate was used for comparison. The rubber mixing allowed obtaining the following data:

| Parameter name | Purified distillate aromatic extract (reference according to the patent) | Low-viscosity high aromatic non-carcinogenic petroleum-based process oil prepared according to example 1 | Relative deviation of the result of the tested sample from the reference, % |
|---|---|---|---|
| Cure characteristics | | | |
| Minimal torque, dNm | 1.6 | 1.6 | 0% |
| Maximal torque, dNm | 12.7 | 12.0 | −7% |
| Time of curing onset, min. | 0.9 | 0.8 | −11% |
| Time to 25% curing, min. | 2.6 | 2.2 | −15% |
| Time to 50% curing, min. | 3.6 | 3.1 | −14% |
| Time to 90% curing, min. | 7.4 | 6.5 | |
| Mooney viscosity | | | |
| Minimal, Mooney units | 55.3 | 56.9 | 3% |
| ML(1 + 4), Mooney units | 36.8 | 36.3 | −1% |
| Physical and mechanical properties of rubber mixtures | | | |
| Nominal stress at 100% elongation, MPa | 2.3 | 2.5 | 9% |
| Nominal stress at 300% elongation, MPa | 10.2 | 10.8 | 6% |
| Nominal tensile strength, MPa | 16.5 | 16.6 | 1% |
| Elongation at break, % | 440 | 420 | −5% |
| Elastic-hysteresis properties of cured rubbers | | | |
| tg δ at −20° C. | 0.595 | 0.710 | 19% |
| tg δ at 0° C. | 0.395 | 0.355 | −10% |
| tg δ at +60° C. | 0.154 | 0.148 | −4% |
| tg δ max | 0.752 | 0.740 | −2% |

| Parameter name | Dibutyl phthalate (reference) | Low-viscosity high aromatic non-carcinogenic petroleum-based process oil prepared according to example 1 | Relative deviation of the result of the tested sample from the reference, % |
|---|---|---|---|
| Plasto-elastic properties of rubber mixtures | | | |
| Shrinkage, % | 30 | 30 | 0% |
| Plasticity, conv. units | 0.43 | 0.43 | 0% |
| Softness, conv. units | 0.46 | 0.45 | −2% |
| Nerviness, conv. units | 0.94 | 0.96 | 2% |
| Cure characteristics | | | |
| Minimal torque, dNm | 1.57 | 1.69 | 8% |
| Maximal torque, dNm | 15.25 | 15.32 | 0% |
| Time of curing onset, min. | 4.37 | 4.65 | 6% |
| Time to 10% curing, min. | 4.51 | 4.79 | 6% |
| Time to 50% curing, min. | 6.31 | 6.58 | 4% |
| Time to 90% curing, min. | 16.62 | 16.75 | 1% |
| Mooney viscosity | | | |
| Minimal, Mooney units | 34.0 | 35.0 | 3% |
| ML(1 + 4), Mooney units | 41 | 41 | 0% |
| Physical and mechanical properties of rubber mixtures | | | |
| Nominal stress at 200% elongation, MPa | 7.7 | 7.6 | −1% |
| Nominal stress at 300% elongation, MPa | 11.8 | 11.6 | −2% |
| Nominal tensile strength, MPa | 12.7 | 13.0 | 2% |
| Elongation at break, % | 320 | 340 | 6% |

One can see from the provided data that the deviation of the principal characteristics both of rubber mixing and curing processes and of the properties of rubber mixtures and cured rubbers is within ±10%, what is not significant. So the proposed low-viscosity high aromatic non-carcinogenic petroleum-based process oil can be used as plasticizer oil for butadiene-nitrile rubbers for replacing dibutyl phthalates in rubber mixtures.

Example 17

The low-viscosity high aromatic non-carcinogenic petroleum-based process oil obtained in example 3 was used as extender oil for a polyurethane elastomer. The preparation of the latter was carried out according to the known method described in the International application WO 2010/100155. A general method for producing two-component polyurethane elastomers comprises preparing a polyol prepolymer (Component A) and an isocyanate prepolymer (Component B) which are combined and left for curing to form a final polyurethane elastomer. The low-viscosity high aromatic non-carcinogenic petroleum-based process oil prepared in example 3 was used in the production both of a polyol prepolymer (Component A) and of an isocyanate prepolymer (Component B).

The polyol prepolymer (Component A) was prepared in the following way. In a 0.5 L reactor with an overhead stirrer 100 g of the low-viscosity high aromatic non-carcinogenic petroleum-based process oil prepared according to example 3 at 25° C. was added with 100 g of commercially available polyol (CARPOL® GP-6515 manufactured by Carpenter Co. which is a glycerol and propylene- and ethylene oxide copolymer having the average molecular weight of about 6000 and the hydroxyl value of about 28 mg KOH/g and the dynamic viscosity of 1200 mPa·s at 25° C.). The obtained mixture was added with 1 g of distilled water as a polymerization catalyst and 1 g of para-phenylenediamine. The mixture was stored in an opaque sealable container. It is noteworthy that the mixture remained stable, without visible signs of separation, homogeneous and transparent for 6 months without a preliminary mixing.

The isocyanate prepolymer (Component B) was prepared in the following way. In a 0.5 L reactor with an overhead stirrer 100 g of the low-viscosity high aromatic non-carcinogenic petroleum-based process oil prepared according to example 3 at 25° C. was added with 100 g of commercially available 4,4'-methylenediphenyl diisocyanate (SUPRASEC 2020 manufactured by Huntsman Holand B.V. which has the dynamic viscosity of 39 mPa·s at 25° C. and the content of NCO-groups of 29.6%). The mixture was stirred for 2 min. and added with a multipurpose isocyanate (Additive TI manufactured by Borcher—para-toluenesulfonyl isocyanate 98%), then the mixture was stirred for 10 min. and quickly transferred to an opaque sealable container. It is noteworthy that the mixture remained stable, without visible signs of separation, homogeneous and transparent for 6 months.

The polyurethane foam elastomer was prepared by mixing equal volumes of the Component A and the Component B. The mixture was cured for 10 hours while forming a dense foam. It is noteworthy that the low-viscosity high aromatic non-carcinogenic petroleum-based process oil did not sweat out of the polyurethane elastomer even if heated up to 50° C.

The provided examples are intended for illustration and do not restrict the scope of the invention which is defined by the scope of the enclosed claims.

The proposed method allows producing a product satisfying International standards which can be used as a plasticizer oil and an extender oil.

The invention claimed is:

1. A method for producing a high aromatic non-carcinogenic petroleum-based process oil from by-product fractions of secondary petrochemical processes by fractional distillation, wherein the by-product fractions of secondary petrochemical processes are products of catalytic cracking, or products of catalytic reforming, or aromatic extracts, or mixtures thereof, which have an initial boiling point of no less than 200° C. and a final boiling point of no less than 360° C. at atmospheric pressure and contain no less than 85 wt. % of aromatic constituents, wherein the fractional distillation process is carried out at a reduced or atmospheric pressure and a fractional distillate, which is the high aromatic non-carcinogenic petroleum-based process oil, is withdrawn at temperatures from the initial boiling point to 420° C. in terms of atmospheric pressure, with a reflux ratio of no less than 0.1, wherein the produced high aromatic non-carcinogenic petroleum-based process oil contains no less than 90 wt. % of aromatic constituents, less than 1.0 mg/kg of benzo[a]pyrene and less than 10.0 mg/kg of the sum of the following polycyclic aromatic hydrocarbons (PAHs): benz [a]anthracene; chrysene; benzo[b]fluoranthene; benzo[i]fluoranthene; benzo[k]fluoranthene; benzo[e]pyrene; benzo[a]pyrene; and dibenzo[a,h]anthracene.

\* \* \* \* \*